(12) United States Patent
Maloney et al.

(10) Patent No.: US 11,287,044 B1
(45) Date of Patent: Mar. 29, 2022

(54) SLIDE SEAL

(71) Applicant: Trim-Lok, Inc., Buena Park, CA (US)

(72) Inventors: Marc Maloney, Elkhart, IN (US); Kelly M. Klein, Elkhart, IN (US)

(73) Assignee: TRIM-LOK, INC., Buena Park, CA (US)

( * ) Notice: Subject to any disclaimer, the term of this patent is extended or adjusted under 35 U.S.C. 154(b) by 0 days.

(21) Appl. No.: 17/345,621

(22) Filed: Jun. 11, 2021

(51) Int. Cl.
  *F16J 15/3284* (2016.01)
  *B62D 65/02* (2006.01)
  *B60P 3/36* (2006.01)

(52) U.S. Cl.
  CPC ............. *F16J 15/3284* (2013.01); *B60P 3/36* (2013.01); *B62D 65/024* (2013.01)

(58) Field of Classification Search
  CPC ........ F16J 15/3284; B60P 3/36; B62D 65/024
  USPC ....................................................... 277/399
  See application file for complete search history.

(56) References Cited

U.S. PATENT DOCUMENTS

| | | |
|---|---|---|
| 2,744,781 A | 5/1956 | Black |
| 3,242,531 A | 3/1966 | Egon |
| 3,242,537 A | 3/1966 | Monti |
| 3,400,964 A | 9/1968 | Baermann |
| 3,411,243 A | 11/1968 | Max |
| 3,719,386 A | 3/1973 | Lambert |
| 3,722,640 A | 3/1973 | Taylor |
| 4,277,919 A | 7/1981 | Artweger et al. |
| 4,361,348 A | 11/1982 | Rapp et al. |
| 4,395,939 A | 8/1983 | Hough et al. |
| 4,448,430 A | 5/1984 | Bright |
| 4,549,761 A | 10/1985 | Lee et al. |
| 4,695,499 A | 9/1987 | Whitener |
| 4,916,864 A | 4/1990 | Thompson |
| 4,955,661 A | 9/1990 | Mattice |
| 5,085,006 A | 2/1992 | Hayashi et al. |
| 5,193,310 A | 3/1993 | Kiel |
| 5,237,782 A | 8/1993 | Cooper |
| 5,408,784 A | 4/1995 | Wruck et al. |
| 5,616,403 A | 4/1997 | Eckberg et al. |
| 5,785,373 A | 7/1998 | Futrell et al. |
| 5,788,306 A | 8/1998 | DiBiagio et al. |
| 5,791,715 A | 8/1998 | Nebel |
| 5,894,698 A | 4/1999 | Dewald, Jr. et al. |
| 6,007,142 A | 12/1999 | Gehman et al. |

(Continued)

FOREIGN PATENT DOCUMENTS

| | | |
|---|---|---|
| DE | 1055976 B | 4/1959 |
| DE | 9300312 U | 3/1993 |

(Continued)

*Primary Examiner* — Pinel E Romain
(74) *Attorney, Agent, or Firm* — Cislo & Thomas, LLP

(57) ABSTRACT

A slide seal for an RV to seal the space in between the corner of a slide-out room of the RV and a wall of the RV, the slide seal having a base to fasten to the wall, a flap seal extending from the base at one end, a bulb seal extending perpendicular to the base at an opposite end, a horn extending from the bulb seal, curving upwardly from the bulb seal and away from the flap seal, and a notch created through the flap seal and the base to create two sections of the base and flap seal so that the first section of the flap seal and base can be bent at approximately a 90 degree angle relative to the second section of the flap seal and base to fit into the corner space in between the slide-out room and the RV wall.

20 Claims, 7 Drawing Sheets

(56) References Cited

U.S. PATENT DOCUMENTS

| | | | |
|---|---|---|---|
| 6,048,016 A | 4/2000 | Futrell et al. | |
| 6,094,870 A | 8/2000 | Stacy | |
| 6,108,983 A | 8/2000 | Dewald, Jr. et al. | |
| 6,152,516 A | 11/2000 | Williams | |
| 6,176,045 B1 | 1/2001 | McManus et al. | |
| 6,203,734 B1 | 3/2001 | Schoonover | |
| 6,224,126 B1 | 5/2001 | Martin et al. | |
| 6,385,927 B2 | 5/2002 | Schiedegger et al. | |
| 6,401,398 B1 | 6/2002 | Panayides et al. | |
| 6,428,073 B1 | 8/2002 | Blodgett, Jr. | |
| 6,527,278 B1 | 3/2003 | Norris | |
| 6,572,170 B2 | 6/2003 | McManus et al. | |
| 6,598,354 B2 | 7/2003 | McManus et al. | |
| 6,619,726 B2 | 9/2003 | Jones | |
| 6,735,909 B1 | 5/2004 | Gardner | |
| 6,739,094 B1 | 5/2004 | Berry et al. | |
| 6,840,568 B2 | 1/2005 | Carrillo et al. | |
| 6,942,225 B2 | 9/2005 | Gentemann et al. | |
| 6,966,590 B1 | 11/2005 | Ksiezopolki et al. | |
| 7,380,854 B1 | 6/2008 | Hanser et al. | |
| 7,540,116 B1 | 6/2009 | Martinson | |
| 7,614,676 B2 | 11/2009 | Ksiezopolski et al. | |
| 7,614,677 B2 | 11/2009 | Ksiezopolski et al. | |
| 7,651,144 B2 | 1/2010 | Clark et al. | |
| 7,743,814 B2 | 6/2010 | Woodward et al. | |
| D648,657 S | 11/2011 | Schoonover et al. | |
| D651,146 S | 12/2011 | Schoonover et al. | |
| 8,192,827 B2 | 6/2012 | Schoonover et al. | |
| D664,669 S | 7/2012 | Schoonover et al. | |
| D664,670 S | 7/2012 | Schoonover et al. | |
| 8,240,744 B2 | 8/2012 | Schwindaman et al. | |
| D669,601 S | 10/2012 | Schoonover et al. | |
| D669,820 S | 10/2012 | Schoonover et al. | |
| 8,366,168 B1 | 2/2013 | Ksiezopolski et al. | |
| 8,382,124 B2 | 2/2013 | Ksiezopolski et al. | |
| 8,408,625 B1 | 4/2013 | Ksiezopolski et al. | |
| D697,640 S | 1/2014 | Ksiezopolski | |
| 8,701,351 B2 | 4/2014 | Siegel | |
| 8,875,443 B2 | 11/2014 | Siegel | |
| 8,910,422 B2 | 12/2014 | Siegel | |
| 8,985,662 B2 | 3/2015 | Siegel | |
| 9,033,390 B1 | 5/2015 | Ksiezopolski | |
| 9,038,322 B2 | 5/2015 | Ksiezopolski | |
| 9,045,027 B2 | 6/2015 | Young et al. | |
| 9,068,355 B1 | 6/2015 | Ksiezopolski | |
| 9,625,037 B2 | 4/2017 | Young et al. | |
| 10,501,026 B2 * | 12/2019 | Ksiezopolski | B60R 13/06 |
| 2002/0078634 A1 | 6/2002 | McManus et al. | |
| 2002/0089213 A1 | 7/2002 | Gehman et al. | |
| 2006/0091687 A1 | 5/2006 | Schoffner et al. | |
| 2006/0117673 A1 | 6/2006 | McManus et al. | |
| 2008/0116707 A1 | 5/2008 | Boaz et al. | |
| 2008/0265618 A1 | 10/2008 | Cadena et al. | |
| 2008/0282617 A1 | 11/2008 | Zimmer et al. | |
| 2009/0045649 A1 | 2/2009 | Eungard et al. | |
| 2012/0032406 A1 | 2/2012 | Ksiezopolski et al. | |
| 2013/0048550 A1 | 2/2013 | Miles et al. | |
| 2013/0086865 A1 | 4/2013 | Schoonover et al. | |
| 2014/0265051 A1 | 9/2014 | Schoonover et al. | |
| 2015/0158438 A1 | 6/2015 | Ksiezopolski | |
| 2016/0003358 A1 | 1/2016 | Young et al. | |

FOREIGN PATENT DOCUMENTS

| | | |
|---|---|---|
| DE | 19912176 A1 | 9/2000 |
| GB | 2001589 A | 2/1979 |
| WO | 9933683 A1 | 7/1999 |
| WO | 0230705 A1 | 4/2002 |

* cited by examiner

SLIDE SEAL

TECHNICAL FIELD

This invention relates to seals for recreational vehicles.

BACKGROUND

Recreational vehicles (RV) are very popular for vacationing and traveling, providing the amenities of a home in a mobile package. The major downside of the RV is the size and number of rooms. To account for the small size and number of rooms, some RVs offer slide-out rooms. A slide-out room is a room or compartment that is housed in the main living compartment of the RV, but can slide out perpendicularly from the main living compartment so as to create an additional room adjacent to the main living compartment. When ready for departure, the slide-out room can slide back into the main compartment again.

A main problem with slide-out rooms is that debris and water can enter into the RV through the gaps created in between the walls of the slide-out room and the wall of the RV defining the opening for the slide-out room. The corners of the walls defining the opening for the slide-out room are particularly problematic because in general, two seals are used to seal the corners, which inherently leaves a small gap in between the two seals. Therefore, there is a need for an improved slide out seal to create a tight seal at the corners of the slide-out rooms.

SUMMARY

The present invention is directed to a slide seal for creating a tight seal at the corners of a slide-out room using a single elongated slide out seal having a notch to allow the slide seal to bend around the corner at the notch creating a one-piece seal that can seal a gap between the corner of the slide-out room and the wall of the RV defining the opening for the slide-out room. The slide seal comprises a base, a flap seal extending from the base on one end, and a bulb seal at the opposite end of the base. When the slide seal is placed on its flap seal and base, the bulb seal projects upwardly from the base creating a gap between the base and the bulb seal. The base and the flap have a notch created therethrough to allow the base to be bent at approximately a 90 degrees angle causing a first portion of the flap seal on one side of the notch to slide over a second portion of the flap seal on the opposite side of the notch and tuck under the bulb seal inside the gap without having to lift the bulb seal. A horn projects from the near the top of the bulb seal and curves upwardly and away from the flap seal.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
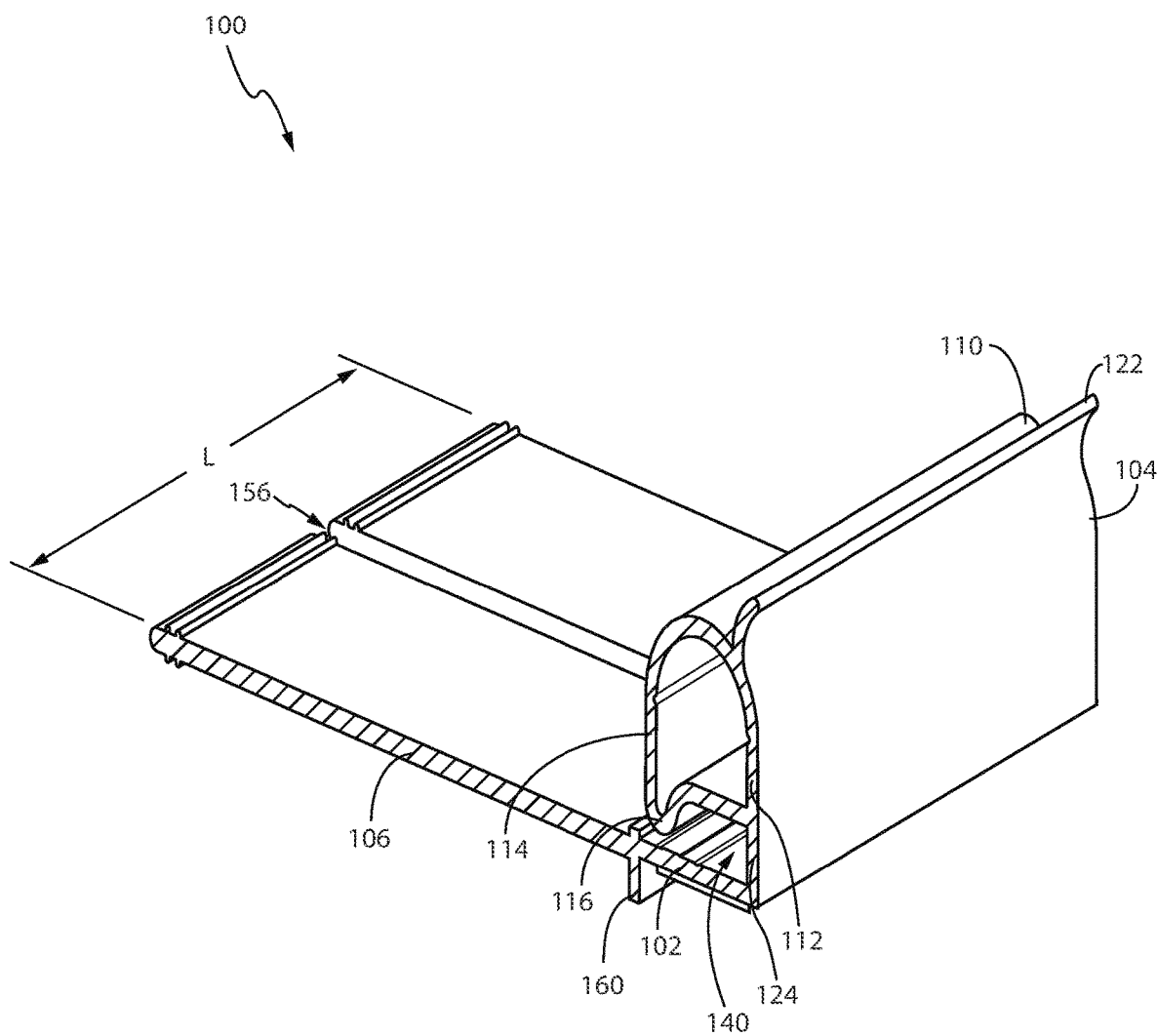
FIG. 1 shows a perspective view of a cross-section of an embodiment of the present invention.
Figure 6:
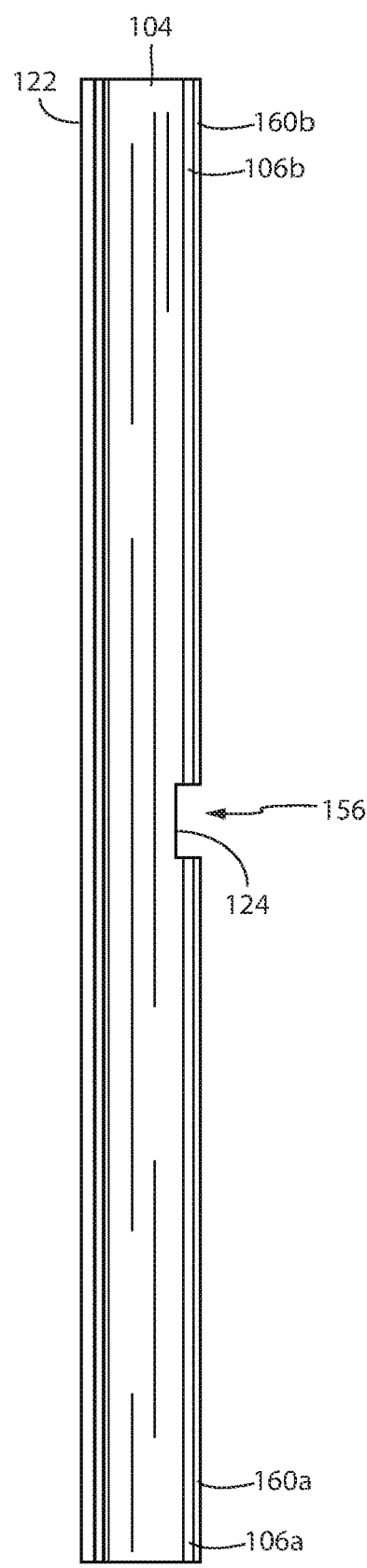
FIG. 6 shows a front view of an embodiment of the present invention.
Figure 7:
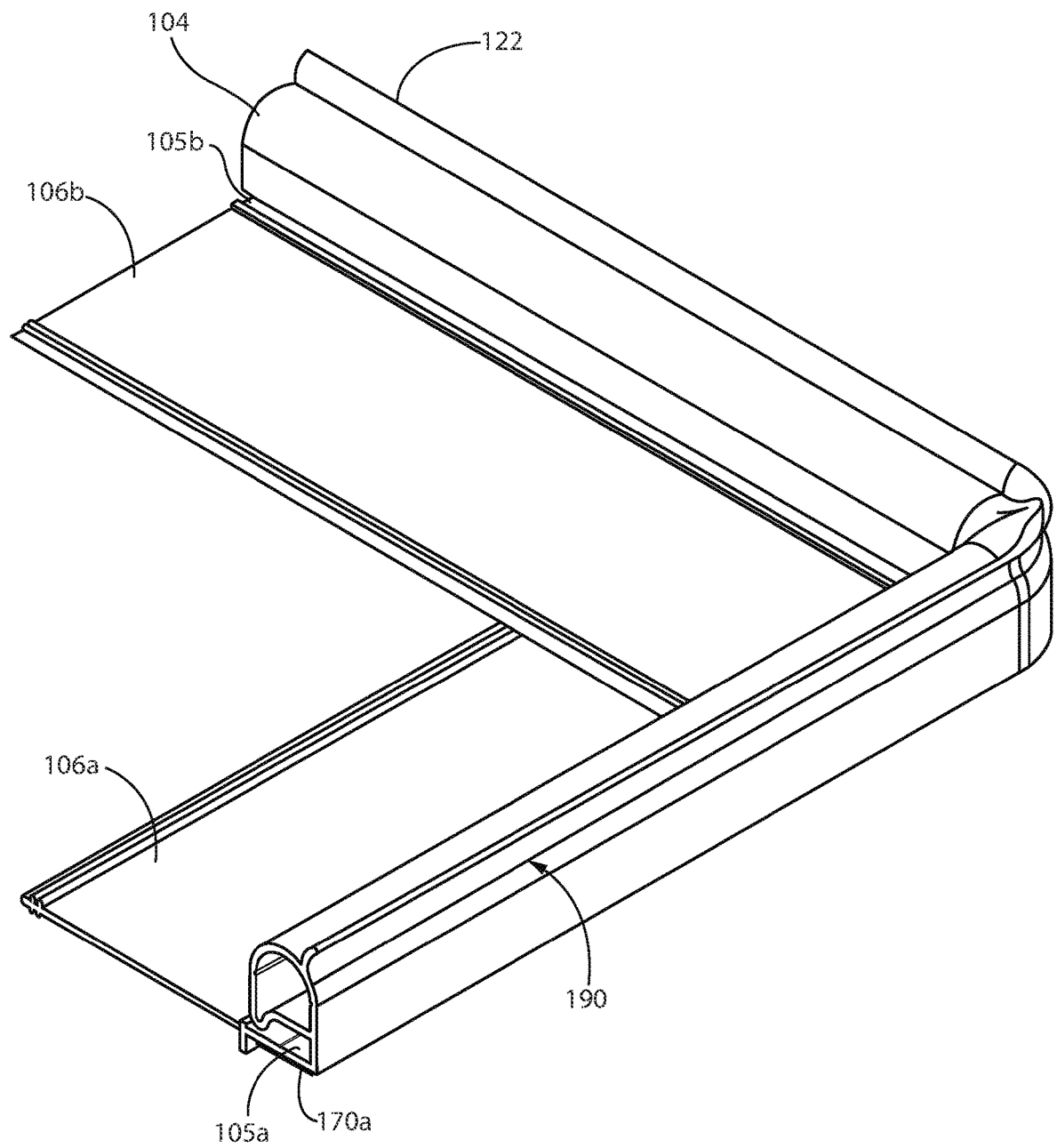
FIG. 7 shows a perspective view of an embodiment of the present invention in the bent configuration.
Figure 8:
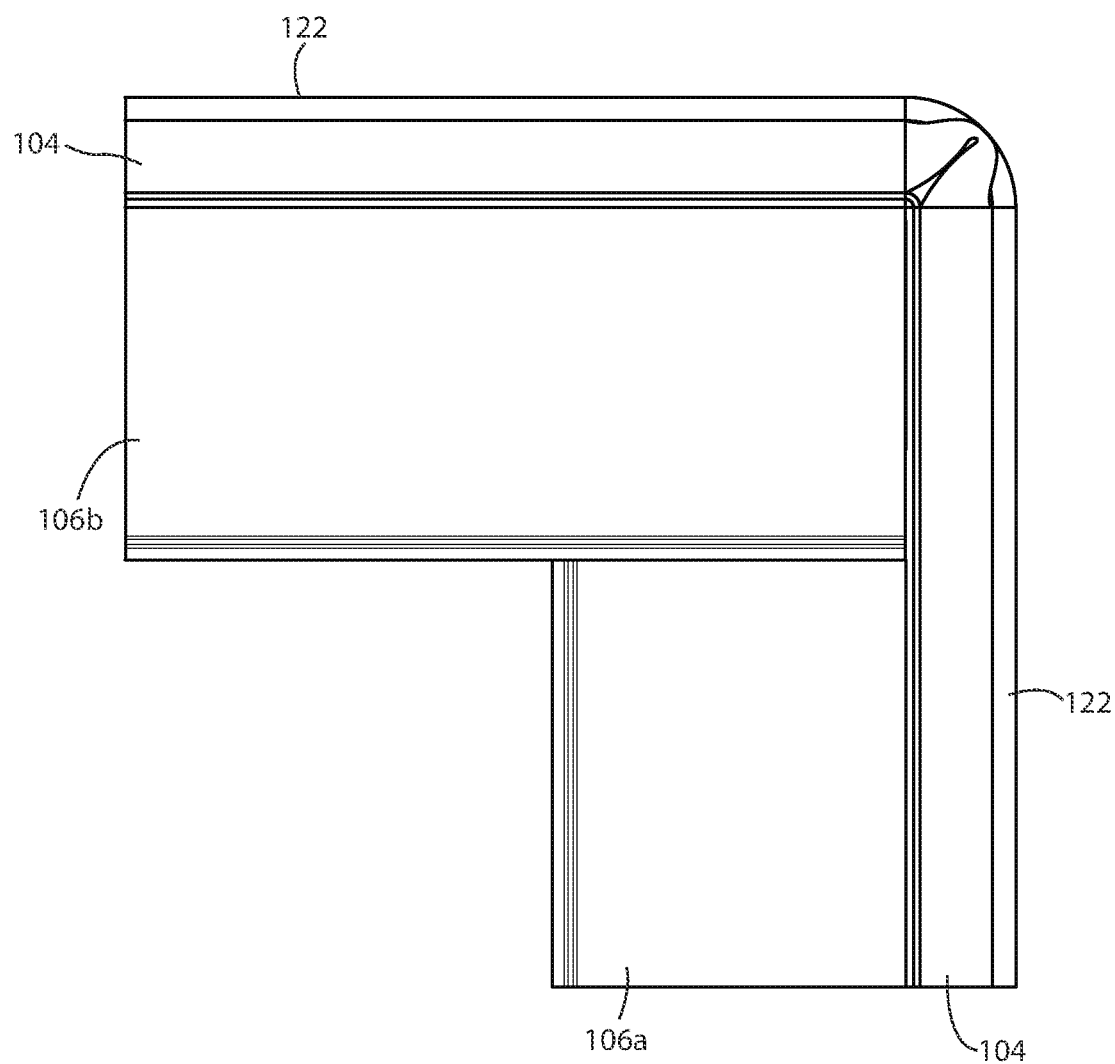
FIG. 8 shows a top plan view of an embodiment of the present invention in the bent configuration.

With reference to FIG. 1, the invention of the present application is directed towards a seal 100 to seal a space at a corner of a slide-out room and a wall (that defines the opening for the slide-out room) of a recreational vehicle to reduce dirt, water, dust, and debris from entering the recreational vehicle as the slide-out room moves in and out. The seal comprises a base 102, a bulb seal 104 attached to the base 102 at one end, and a flap seal 106 attached to the base 102 at the opposite end, with a notch 156 splitting a portion of the base 102 and a portion of the flap seal 106 into two parts, but not the bulb seal 104. By splitting a portion of the base 102 and a portion of the flap seal 106 into two parts, the seal 100 can be bent at a 90 degree angle at the notch 156 (as shown in FIGS. 6 and 7) so that the seal 100 can fit into the corner.

Figure 2:
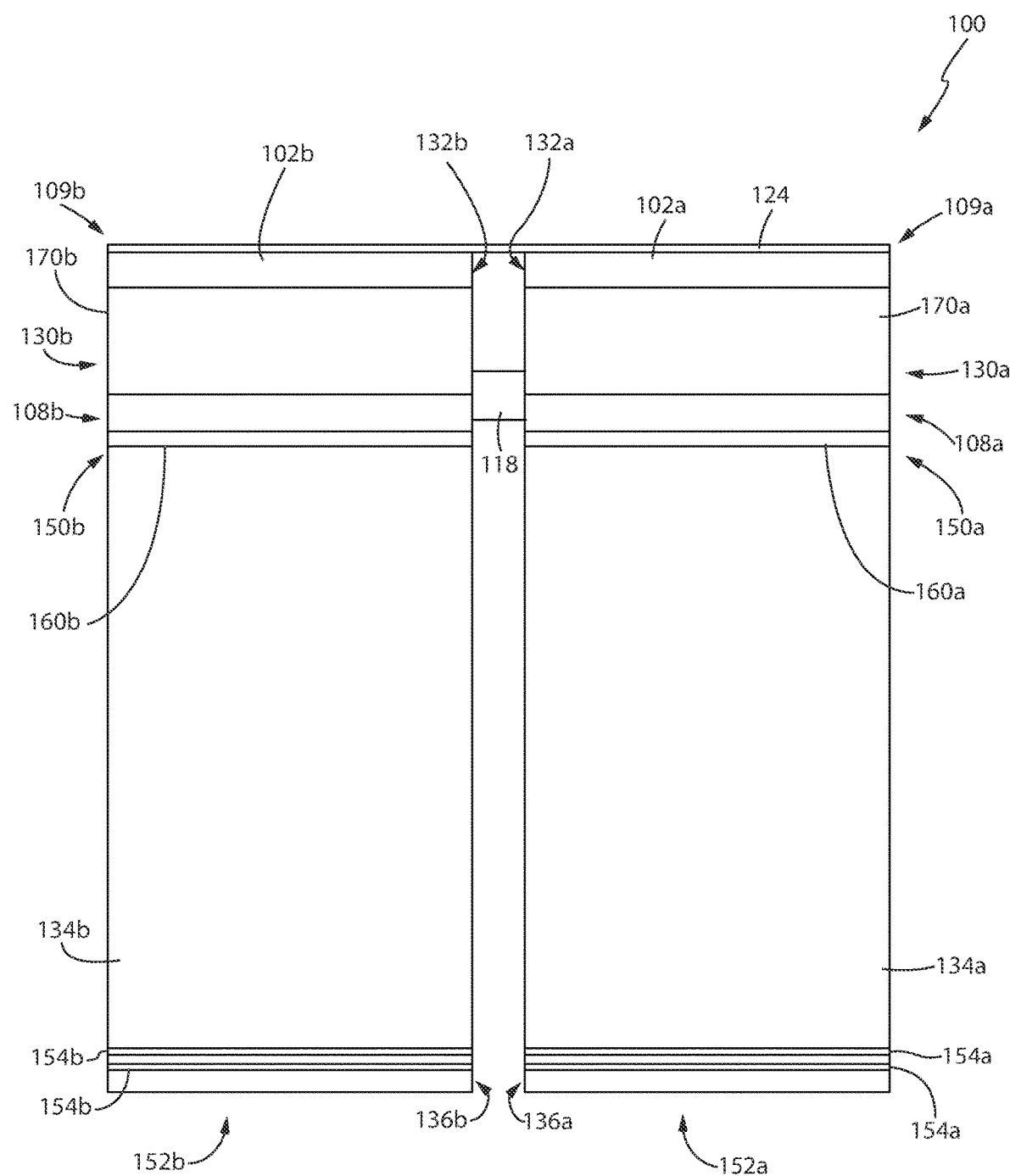
FIG. 2 shows a bottom plan view of an embodiment of the present invention.
Figure 3:
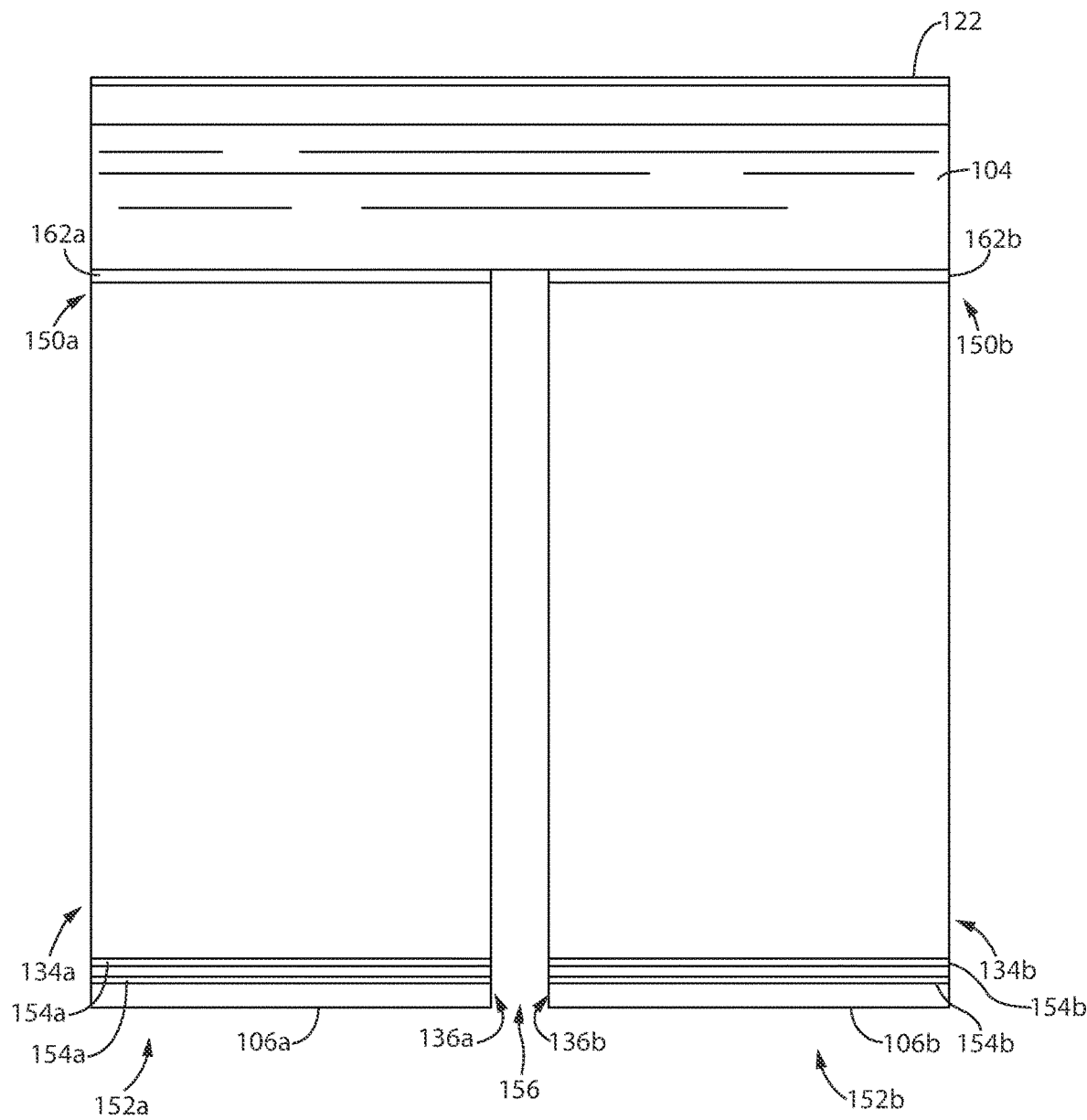
FIG. 3 shows a top plan view of an embodiment of the present invention.

As such, as shown in FIGS. 2 and 3, because the notch 156 splits the base 102 and the flap seal 104, the seal 100 can be characterized as having a first base 102a and a second base 102b, and a first flap seal 106a and a second flap seal 106b. The first base 102a can have a first front end 108a, a first back end 109a opposite the first front end 108a, a first lateral side 130a adjacent to the first front end 108a and the first back end 109a, and a first medial side 132a opposite the first lateral side 130a and adjacent to the first front end 108a and the first back end 109a. The first base 102a also has a first surface 105a adjacent to the bulb 104, and a second surface 107a opposite the first surface 105a.

A first flap seal 106a can extend from the first front end 108a of the first base 102a, the first flap seal 106a having a first proximal end 150a, and a first free end 152a, the first proximal end 150a operatively connected to the first base 102a. The first flap seal 106a also has a first lateral end 134a adjacent to the first proximal end 150a and the first free end 152a, and a first medial end 136a opposite the first lateral end 134a and adjacent to the first proximal end 150a and the first free end 152a. The first flap seal 106a and the first base 102a are generally planar. As such, in the preferred embodiment, the first flap seal 106a extends generally in the same plane as the first base 102a, although the first flap seal 106a can be thicker than the first base 102a.

At about the junction where the first flap seal 106a and first base 102a meet, there can be a first stop 160a projecting perpendicularly from the second surface 107a in the direction opposite the bulb seal 104. At about the junction where the first flap seal 106a and first base 102a meet, there can also be a first step 162a projecting perpendicularly from the first surface 105a opposite the first stop 160a. As such, the first step 162a projects in the direction of the bulb seal 104. The height of the first step 162a projecting towards the bulb seal 104 is preferably smaller than the height of the first stop 160a projecting away from the bulb seal 104. The first stop 160a and the first step 162a can extend the full length of the first base 102a.

In some embodiments, the first stop 160a and/or the first step 162a can stop short of the first medial side 132a. The extent to which the first stop 160a and/or the first step 162a stops short of the first medial side 132a should be enough so as not to obstruct or overlap with the second flap seal 106b when the seal 100 is bent into its 90 degree angle. In other words, the first stop 160a and/or the first step 162a should stop short at least approximately the width of the second flap seal 106b.

Adjacent to the first free end 152a of the first flap seal 106a is a first ridge 154a that projects perpendicularly from the first flap seal 106a on opposite sides. Preferably, there is a first plurality of ridges 154a parallel to each other projecting from the first flap seal 106a on opposite sides.

The second base 102b and the second flap seal 106b are essentially mirror images of the first base 102a and the first flap seal 106a. Therefore, the second base 102b can have a second front end 108b, a second back end 109b opposite the second front end 108b, a second lateral side 130b adjacent to the second front end 108b and the second back end 109b, and a second medial side 132b opposite the second lateral side 130b and adjacent to the second front end 108b and the second back end 109b. The second base 102b also has a first surface 105b adjacent to the bulb 104, and a second surface 107b opposite the first surface 105b.

A second flap seal 106b can extend from the second front end 108b of the second base 102b, the second flap seal 106b having a second proximal end 150b, and a second free end 152b, the second proximal end 150b operatively connected to the second base 102b. The second flap seal 106b also has a second lateral end 134b adjacent to the second proximal end 150b and the second free end 152b, and a second medial end 136b opposite the second lateral end 134b and adjacent to the second proximal end 150b and the second free end 152b. The second flap seal 106b and the second base 102b are generally planar. As such, in the preferred embodiment, the second flap seal 106b extends generally in the same plane as the second base 102b, although the second flap seal 106b can be thicker than the second base 102b.

At about the junction where the second flap seal 106b and second base 102b meet, there can be a second stop 160b projecting perpendicularly from the second surface 107b of the second base 102b in the direction opposite the bulb seal 104. At about the junction where the second flap seal 106b and second base 102b meet, there can also be a second step 162b projecting perpendicularly from the first surface 105b opposite the second stop 160b. As such, the second step 162b projects in the direction of the bulb seal 104. The height of the second step 162b projecting towards the bulb seal 104 is preferably smaller than the height of the second stop 160b projecting away from the bulb seal 104.

In some embodiments, the second stop 160a and/or the second step 162a can stop short of the second medial side 132a. The extent to which the second stop 160a and/or the second step 162a stops short of the second medial side 132a should be enough so as not to obstruct or overlap with the first flap seal 106a when the seal 100 is bent into its 90 degree angle. In other words, the second stop 160a and/or the second step 162a should stop short at least approximately the width of the first flap seal 106a.

At the second free end 152b of the second flap seal 106b is a second ridge 154b that projects perpendicularly from the second flap seal 106b on opposite sides. Preferably, there is a second plurality of ridges 154b parallel to each other.

To allow for the seal 100 to conform to a corner of a wall, a notch 156 is created in between the first flap seal 106a and the second flap seal 106b, and in between the first base 102a and the second base 102b. Specifically, the notch 156 is created in between the first medial sides 132a, 136a and the second medial sides 132b, 136b of the bases 102a, 102b and the flap seals 106a, 106b. The notch 156 extends the length full width of the flap seals 106a, 106b and the bases 102a, 102b from the free ends 152a, 152b of the first and second flap seals 106a, 106b to the back ends 109a, 109b of the first and second bases 102a, 102b.

The width of the notch 156 from the medial side 132a of the first base 102a to the medial side 132b of the second base 102b (or the medial side 136a of the first flap seal 106a to the medial side 136b of the second flap seal 106b) is sufficiently wide to allow the first base 102a to bend 90 degrees relative to the second base 102b causing the first medial side 132a to be adjacent to and aligned with the second back end 109b of the second base 102b. Similarly, the second medial side 132b is placed adjacent to and aligned with the first back end 109a of the first base 102a. Either the first flap seal 106a can slide over the second flap seal 106b, or the second flap seal 106b can slide over the first flap seal 106a. In either case, the bulb seal 104 need not be lifted up to slide one of the flap seals 106a, 106b underneath the bulb seal 104. In one embodiment, the width of the notch 156 is approximately 0.95 inch. The width of the notch can range from about 0.75 inch to about 1.5 inch. Preferably, the width of the notch is about 0.8 inch to about 1.25 inch. More preferably, the width of the notch is about 0.9 inch to about 1.1 inch.

Figure 4:
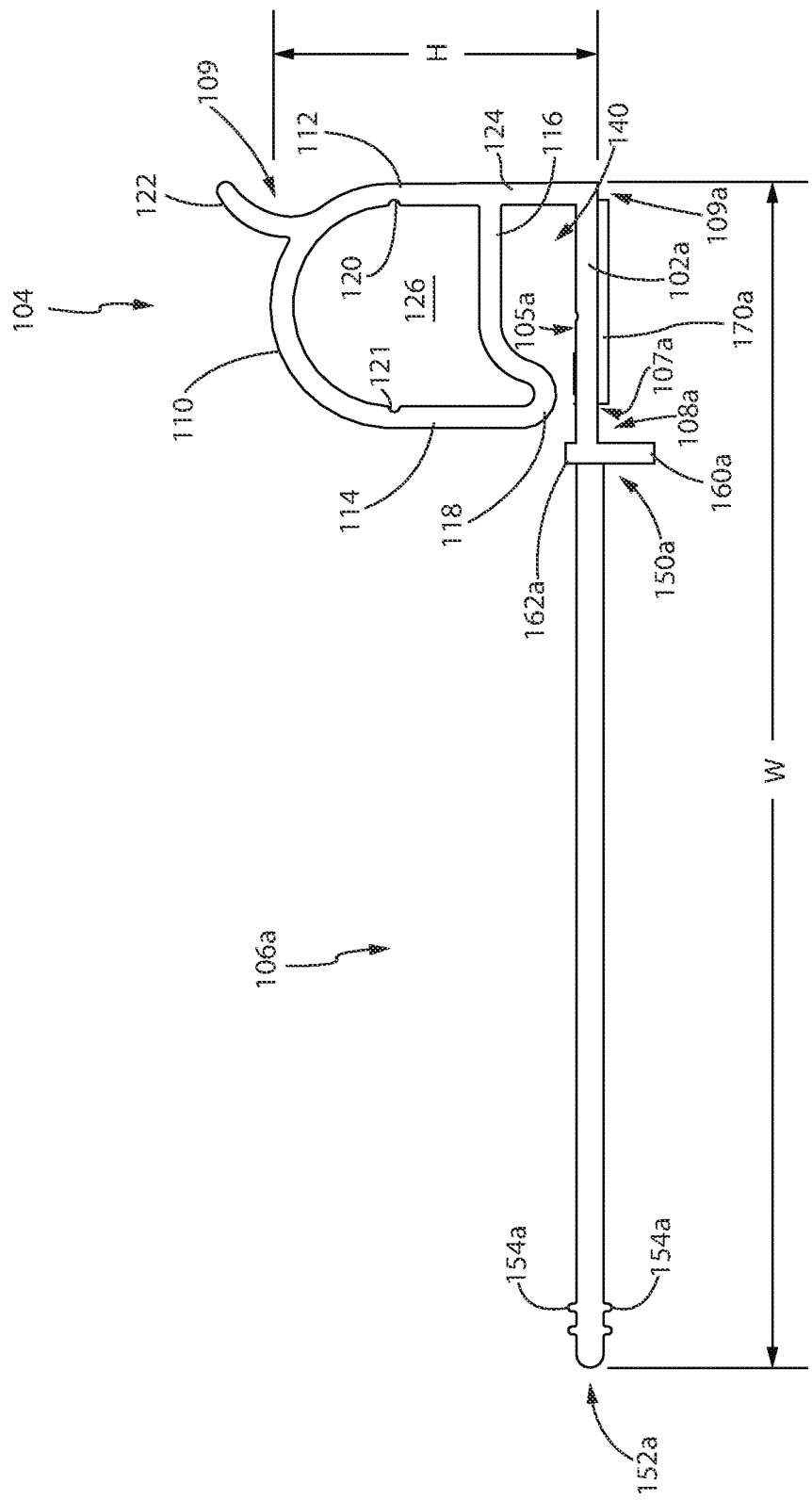
FIG. 4 shows a side view of an embodiment of the present invention.
Figure 5:
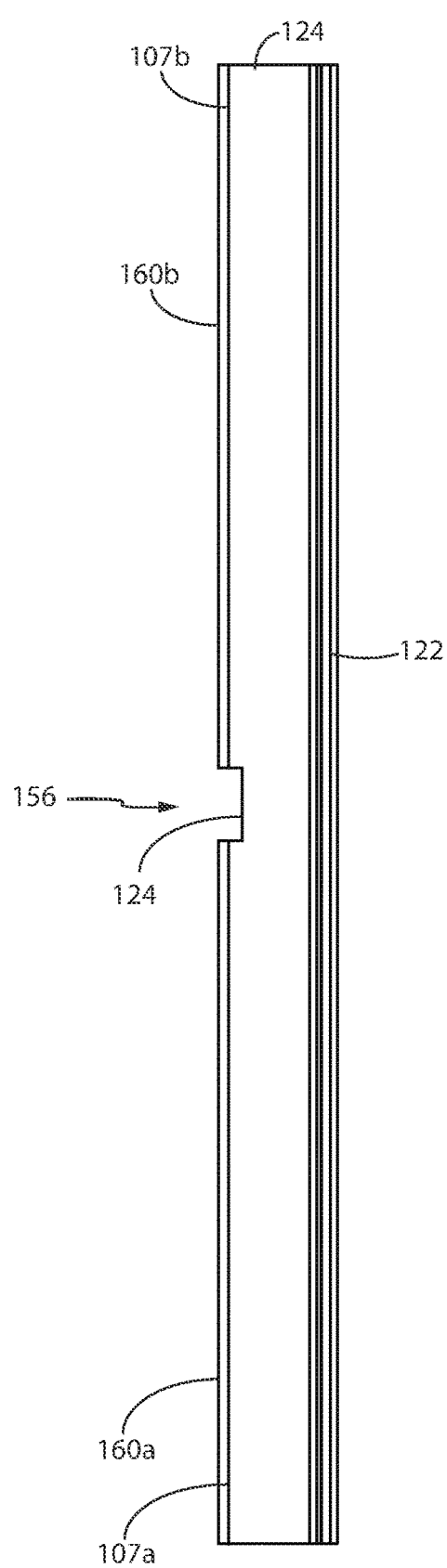
FIG. 5 shows a rear view of an embodiment of the present invention.

In order to achieve the bent configuration, either the first flap seal 106a or the second flap seal 106b must slide underneath the bulb seal 104. As such, as shown in FIG. 4, a gap 140 must be created in between the bulb seal 104 and the first and second bases 102a, 102b. A gap 140 can be created between the bulb seal 104 and the bases 102a, 102b using a back wall 124 extending perpendicularly from the first back end 109a and the second back end 109b towards the bulb seal 104. The back wall 124 operatively connects the first base 102a and the second base 102b to each other and to the bulb seal 104. The back wall 124 is a flat wall defining a plane. As shown in FIGS. 5 and 6, in some embodiments, the notch 156 may pass through a portion of the back wall 124 adjacent to the first and second bases 102a, 102b, thereby extending the notch 156 into a portion of the back wall 124.

The bulb seal 104 extends from the back wall 124 opposite the first base 102a and the second base 102b. As such, the bulb seal 104 is separated from the first base 102a and the second base 102b by the gap 140 due to the back wall 124. The gap 140 is large enough to allow the first flap seal 106a or the second flap seal 106b to slide in between the base 102a, 102b and the bulb seal 104.

The bulb seal 104 comprises a floor 116 extending perpendicularly from the back wall 124; a first wall 112 extending from and parallel to the back wall 124, and perpendicular to the floor 116; a second wall 114 opposite the first wall 112, the second wall 114 connected to the floor 116; and an arch 110 connecting the first wall 112 to the second wall 114 opposite the floor 116. As such, the bulb seal 104 has a generally D-shaped profile.

In the preferred embodiment, the bulb seal 104 further comprises a lip 118 adjacent to the second wall 114 and the floor 116. The lip 118 protrudes towards the first base 102a and the second base 102b narrowing a portion of the gap 140.

The bulb seal 104 has a hollow interior cavity 126 defined by the first wall 112, the second wall 114, the arch 110 and the floor 116. The interior sides of the first wall 112 and second wall 114 may each comprise a notch 120, 121. A first notch 120 can be on the first wall 112 adjacent to the arch 110, and the second notch 121 can be on the second wall 114 adjacent to the arch 110.

Preferably, a horn 122 extends from the bulb seal 104 above the first wall 112, and curves towards the plane of the back wall 124. More preferably, the horn 122 extends up to the plane of the back wall 124.

To facilitate installation of the seal 100, a first fastener 170a can be applied to the second surface 107a of the first base 102b, and a second fastener 170b can be applied to the second surface 107b of the second base 102b. Preferably, the first and second fasteners 170a, 170b are adhesives, but other fasteners can be used such as nails, screws, staples, and the like. In use, the first fastener 170a can be exposed and the first base 102a can be aligned with a first portion of a wall that defines a rectangular opening by aligning the first stop 160a against the edge of the first portion of the wall to assure straight alignment. The first base 102a can be fastened onto the first wall using the first fastener 170a. The second fastener 170b can be exposed on the second base 102b. The second base 102b can be bent at approximately 90 degrees to the first base 102a, and aligned with a second portion of the wall that is adjacent and 90 degrees to the first portion of the wall (thereby forming a corner with the first wall) using the second stop 160b. While bending the second base 102b 90 degrees relative to the first base 102a, the second flap seal 106b can be slid under the bulb seal 104 into the gap 140 defined by the floor 116 of the bulb seal 104 and the top side 105a of the first base 102a without lifting the bulb seal 104. Alternatively, the second flap seal 106b can be slid underneath the first flap seal 106a so that the first flap seal 106a slides underneath the bulb seal 104 into the gap 140 defined by the floor 116 of the bulb seal 104 and the top side 105b of the second base 102b. The second base 102b can be fastened to the second wall using the second fastener 170b. The sequence of steps is not limiting so long as the seal 100 is fastened to the corner of the wall with the first base 102a at a 90 degree angle relative to the second base 102b. When attached in this arrangement, the horn 122 creates a water management gutter system to drastically increase the sealing effects of the seal 100.

In some embodiments, the height of the bulb seal 104 as measured from the bottom side 107a, 107b of the base 102a, 102b to the top of the arch 110 is preferably approximately 1.2 inches. The height of the bulb seal can range from about 0.75 inch to about 1.75 inch. Preferably, the height of the bulb seal 104 can range from about 1 inch to about 1.5 inch. More preferably, the height of the bulb seal 104 can range from about 1.2 inch to about 1.3 inch. In one embodiment, the width of the bulb seal 104 measured from the outside of the first wall 112 to the outside of the second wall 114 is 0.9 inch. The width of the bulb seal 104 can range from about 0.5 inch to about 1.5 inch. Preferably, the width of the bulb seal 104 can range from about 0.75 inch to about 1.25 inch. More preferably, the width of the bulb seal 104 can range from about 0.9 inch to about 1 inch.

In some embodiments, the width of the base 102a, 102b as measured from the front end 108a, 108b to the back end 109a, 109b is 0.96 inch. The width of the base 102a, 102b can range from about 0.5 inch to about 1.5 inch. Preferably, the width of the base 102a, 102b can range from about 0.75 inch to about 1.25 inch. More preferably, the width of the base 102a, 102b is about 0.9 inch to about 1.0 inch.

In some embodiments, the flap seal 106a, 106b has a width as measured from its proximal end 150a, 150b to its free end 152a, 152b of about 2.5 inches. The width of the flap seal 106a, 106b can range from about 1.5 inches to about 3.5 inches. Preferably, the width of the flap seal 106a, 106b can range from about 2 inches to about 3 inches. More preferably, the width of the flap seal 106a, 106b can range from about 2.25 inches to about 2.75 inches.

In some embodiments, the width of the notch as measured from the medial side 132a of the first base 102a to the medial side 132b of the second base 102b can range from about 0.75 inch to about 1.5 inch. Preferably, the width of the notch is about 0.8 inch to about 1.25 inch. More preferably, the width of the notch is about 0.9 inch to about 1.1 inch.

The slide seal 100 can be manufactured using plastic extrusion techniques, including multi-extrusion techniques, such as co-extrusion or tri-extrusion. Using multi-extrusion techniques allows the different components, such as the base 102a, 102b, the bulb seal 104, flap seal 106a, 106b, and other components can be made with different material, hardness, or flexibility as desired. The material for the various components may be EPDM rubber. They can also be manufactured with plastic using TPV, TPO and TPE, or any combination thereof.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A seal for sealing a space between a corner of slide-out room and a wall of a recreational vehicle, the seal comprising:
   a) a first base having a first top side, a first bottom side opposite the top side, a first front end, a first back end opposite the first front end, a first lateral side adjacent to the first front end and the first back end, and a first medial side opposite the first lateral side and adjacent to the first front end and the first back end;
   b) a first stop projecting perpendicularly from the bottom side adjacent the first front end of the first base;
   c) a first step projecting perpendicularly from the top side adjacent the first front end of the first base opposite the first stop;
   d) a first flap seal extending from the first front end of the first base, the first flap seal having a first proximal end, and a first free end, the first proximal end operatively connected to the first base;
   e) a first plurality of ridges projecting from the first flap seal adjacent to the first free end;
   f) a second base having a second top side, a second bottom side opposite the second top side, a second front end, a second back end opposite the second front end, a second lateral side adjacent to the second front end and the second back end, and a second medial side opposite the second lateral side and adjacent to the second front end and the second back end;

g) a second stop projecting perpendicularly from the second bottom side adjacent to the second front end of the second base;
h) a second step projecting perpendicularly from the second top side adjacent to the second front end of the second base opposite the second stop;
i) a second flap seal extending from the second front end of the second base, the second flap seal having a second proximal end, and a second free end, the second proximal end operatively connected to the second base;
j) a second plurality of ridges projecting from the second flap seal adjacent to the second free end;
k) a notch separating the first base and the first flap seal from the second base and the second flap seal;
l) a back wall extending perpendicularly from the first back end and the second back end, the back wall defining a plane, the back wall operatively connecting the first base and the second base, wherein the notch extends from the first free end and second free end of the first and second flap seals to the back wall;
m) a bulb seal extending from the back wall opposite the first base and the second base, the bulb seal comprising a floor extending perpendicularly from the back wall, a first wall extending from the back wall and perpendicular to the floor, a second wall opposite the first wall, the second wall connected to the floor by a lip, an arch connecting the first wall to the second wall opposite the floor, a curved horn extending from the arch curving towards the plane of the back wall, a first notch on the first wall adjacent to the arch, and a second notch on the second wall adjacent to the arch, wherein the floor of the bulb seal is separated from the first base and the second base by a gap.

2. A seal for sealing a space between a corner of slide-out room and a wall of a recreational vehicle, the seal comprising:
a) a first base having a first surface, a second surface opposite the first surface, a first front end, a first back end opposite the first front end, a first lateral side adjacent to the first front end and the first back end, and a first medial side opposite the first lateral side and adjacent to the first front end and the first back end;
b) a first flap seal extending from the first front end of the first base, the first flap seal having a first proximal end, and a first free end, the first proximal end operatively connected to the first base;
c) a second base having third surface, a fourth surface opposite the third surface, a second front end, a second back end opposite the second front end, a second lateral side adjacent to the second front end and the second back end, and a second medial side opposite the second lateral side and adjacent to the second front end and the second back end;
d) a second flap seal extending from the second front end of the second base, the second flap seal having a second proximal end, and a second free end, the second proximal end operatively connected to the second base, wherein the first flap and the second flap are separated by a notch;
e) a back wall extending perpendicularly from the first back end and the second back end, the back wall operatively connecting the first base and the second base, the back wall defining a plane;
f) a bulb seal extending from the back wall opposite the first base and the second base, wherein the bulb seal is separated from the first base and the second base by a gap due to the back wall,
g) a curved horn extending from the bulb seal and curving towards the plane of the back wall.

3. The seal of claim 2, wherein curved horn extends up to the plane of the back wall.

4. The seal of claim 3, wherein the bulb seal comprising a floor extending perpendicularly from the back wall, a first wall extending from the back wall and perpendicular to the floor, a second wall opposite the first wall, the second wall connected to the floor, an arch connecting the first wall to the second wall opposite the floor.

5. The seal of claim 4, wherein the bulb seal comprises a lip adjacent to the second wall and the floor, the lip protruding towards the first base and the second base.

6. The seal of claim 5, wherein the bulb seal further comprises a first notch on the first wall adjacent to the arch, and a second notch on the second wall adjacent to the arch.

7. The seal of claim 6, further comprising:
a) a first stop projecting perpendicularly from the second surface of the first base adjacent to the first front end; and
b) a second stop projecting perpendicularly from the fourth surface of the second base adjacent to the second front end.

8. The seal of claim 7, further comprising:
a) a first step projecting perpendicularly from the first surface of the first base adjacent to the first front end; and
b) a second step projecting perpendicularly from the third surface of the second base adjacent to the second front end.

9. The seal of claim 8, further comprising:
a) a first plurality of ridges projecting from the first flap seal adjacent to the first free end; and
b) a second plurality of ridges projecting from the second flap seal adjacent to the second free end.

10. The seal of claim 9, wherein the notch extends into a portion of the back wall.

11. The seal of claim 2, further comprising:
a) a first stop projecting perpendicularly from the second bottom surface of the first base at the first front end; and
b) a second stop projecting perpendicularly from the fourth bottom surface of the second base at the second front end.

12. The seal of claim 2, further comprising:
a) a first step projecting perpendicularly from the first surface of the first base towards the bulb seal adjacent to the first front end; and
b) a second step projecting perpendicularly from the third surface of the second base towards the bulb seal adjacent to the second front end.

13. The seal of claim 2, wherein the flap seal comprises:
a) a first plurality of ridges adjacent to the first free end; and
b) a second plurality of ridges adjacent to the second free end.

14. The seal of claim 2, wherein the notch extends from the first and second free ends of the first and second flap seals through the first and second bases.

15. The seal of claim 14, wherein the notch extends into a portion of the back wall.

16. A method of sealing a corner space between a slide-out room and a wall of a recreational vehicle, the method comprising:
a) providing a slide seal having a first base portion, a first flap seal extending from the first base, a second base adjacent to the first base, a second flap seal extending from the second base adjacent to the first flap seal, a notch separating the first base and first flap seal from the second base and second flap seal, a first bulb seal extending from the first base and second base operatively connecting the first base to the second base;
- b) aligning the first base of the slide seal with a first portion of the wall of the recreational vehicle that defines a rectangular opening;
- c) fastening the first base to the first portion of the wall with a first fastener;
- d) bending the second base of the slide seal at approximately 90 degrees to the first base at the notch created in the slide seal;
- e) aligning the second base with a second portion of the wall that is adjacent and 90 degrees to the first portion of the wall; and
- f) fastening the second base to the second portion of the wall, whereby the corner space between the slide-out room and the wall of the recreational vehicle is sealed.

17. The method of claim 16, further comprising the step of sliding the second flap seal into the gap between the first base and the bulb seal without lifting the bulb seal.

18. The method of claim 16, further comprising the step of sliding the first flap seal into the gap between the second base and the bulb seal without lifting the bulb seal.

19. The method of claim 16, wherein the step of aligning the first base comprises aligning a stop of the slide seal against an edge of the first portion of the wall.

20. The method of claim 16, wherein the step of aligning the second base comprises aligning a stop of the slide seal against an edge of the second portion of the wall.

* * * * *